(12) United States Patent
Li et al.

(10) Patent No.: US 12,096,359 B2
(45) Date of Patent: Sep. 17, 2024

(54) TARGET WAKE TIME-BASED CLOCK CORRECTION METHOD AND DEVICE

(71) Applicant: TP-LINK CORPORATION LIMITED, Hong Kong (CN)

(72) Inventors: Wanyi Li, Shenzhen (CN); Changqiang Wu, Shenzhen (CN)

(73) Assignee: TP-Link Corporation Limited, Hong Kong (CN)

( * ) Notice: Subject to any disclaimer, the term of this patent is extended or adjusted under 35 U.S.C. 154(b) by 0 days.

(21) Appl. No.: 18/571,203

(22) PCT Filed: Nov. 18, 2022

(86) PCT No.: PCT/CN2022/132828
§ 371 (c)(1),
(2) Date: Dec. 15, 2023

(87) PCT Pub. No.: WO2023/088419
PCT Pub. Date: May 25, 2023

(65) Prior Publication Data
US 2024/0259940 A1     Aug. 1, 2024

(30) Foreign Application Priority Data

Nov. 19, 2021 (CN) .......................... 202111408248.8

(51) Int. Cl.
*H04L 12/807* (2013.01)
*H04W 52/02* (2009.01)
(Continued)

(52) U.S. Cl.
CPC ... *H04W 52/0219* (2013.01); *H04W 52/0216* (2013.01); *H04W 56/0015* (2013.01); *H04W 84/12* (2013.01)

(58) Field of Classification Search
CPC ......... H04W 52/0219; H04W 52/0216; H04W 56/0015; H04W 84/12
See application file for complete search history.

(56) References Cited

U.S. PATENT DOCUMENTS 11,153,824 B1   10/2021   Jia
2013/0272455 A1   10/2013   Homchaudhuri
(Continued)

FOREIGN PATENT DOCUMENTS

CN          114070447        2/2022

OTHER PUBLICATIONS

Written Opinion and International Search Report for PCT/CN2022/132828 dated Feb. 11, 2023, 10 pages.
(Continued)

*Primary Examiner* — Walli Z Butt
(74) *Attorney, Agent, or Firm* — Loeb & Loeb LLP (57) ABSTRACT

The present application discloses a target wake time (TWT)-based clock correction method and device. Each TWT corresponds to one wake time period, and time before the wake time period is a TWT sleep period of a station STA. The method includes: before entering a current TWT sleep period, determining a next-time TWT immediately following the current TWT sleep period; before entering the current TWT sleep period, determining an advance time amount for the next TWT on the basis of obtained clock drift values between the STA and a wireless access point AP and the number of target beacon transmission times (TBTTs) corresponding to the current TWT sleep period; and performing clock correction on the STA according to the time advance time amount and an expected time amount required for completing clock correction on the basis of a detection interaction process.

20 Claims, 4 Drawing Sheets

(51) Int. Cl.
  *H04W 56/00*  (2009.01)
  *H04W 84/12*  (2009.01)

(56) References Cited

U.S. PATENT DOCUMENTS

| | | | | |
|---|---|---|---|---|
| 2015/0382283 | A1* | 12/2015 | Wang | H04W 52/0216 |
| | | | | 370/328 |
| 2016/0050624 | A1* | 2/2016 | Tirronen | H04W 52/0229 |
| | | | | 370/311 |
| 2018/0063784 | A1* | 3/2018 | Abraham | A61N 1/37252 |
| 2022/0264463 | A1* | 8/2022 | Li | H04W 24/04 |
| 2022/0278938 | A1* | 9/2022 | Waheed | H04W 56/0035 |
| 2022/0279601 | A1* | 9/2022 | Xue | H04W 74/0816 |

OTHER PUBLICATIONS

English translation of International Search Report for PCT/CN2022/132828 dated Feb. 11, 2023, 3 pages.
English translation of Written Opinion for PCT/CN2022/13828, dated Feb. 11, 2023, 3 pages.
Bankov, Dmitry, et al. "Clock drift impact on target wake time in IEEE 802.11 ax/ah networks." 2018 Engineering and Telecommunication (EnT-MIPT). IEEE, 2018. 5 pages.

* cited by examiner

TARGET WAKE TIME-BASED CLOCK CORRECTION METHOD AND DEVICE

CROSS-REFERENCE TO RELATED APPLICATIONS

The present application is a U.S. national phase of PCT international application PCT/CN2022/132828, filed on Nov. 18, 2022, which further claims the priority of China Patent Application No. 202111408248.8 filed on Nov. 19, 2021, and the contents of the above-mentioned applications are hereby incorporated in their entirety as a part of the present disclosure.

TECHNICAL FIELD

The present disclosure relates to a field of wireless communication, and more particularly, to a clock correction method and device based on target wake time.

BACKGROUND

Target Wake Time (TWT) technology is a newly added mechanism in the 11ax protocol, and the technology allows a Station (STA) to intermittently communicate with an Access Point (AP), and to enter a sleep state during remaining time, so as to optimize energy management of the STA and prevent a slow-speed device from occupying bandwidth for a long time. By scheduling and adjusting STA communication activities at different times, a purpose of minimizing competition is achieved, and meanwhile, wake time required for the STA using a Power Save (PS) mode may also be reduced, to further reduce STA energy consumption.

The STA needs to access a channel at an agreed TWT time (i.e., a time point) according to a pre-negotiated TWT value, send information to the AP or wait for a Trigger frame of the AP for Multi-User (MU) transmission. However, many mobile devices (especially, IoT related devices) usually do not have a highly accurate clock due to cost constraints, and the devices have to constantly listen (or monitor) a Beacon of the AP to update and synchronize their own clocks. Therefore, if the STA sleeps for a long time, it is likely to cause clock drift due to insufficient accuracy of its own clock, causing the clock of the STA and the clock of the AP to no longer synchronize, and further causing the STA to be in capable of accessing the channel at the agreed TWT time. Due to this, the STA participating in a Trigger-based Target wake time (Trigger-based TWT) is likely to miss the Trigger frame of the AP, resulting in longer waiting time and greater overhead. The STA not participating in the Trigger-based TWT may also have a wake time coincide with the wake time of other STAs, increasing competition for channel access. These problems will lead to increase in STA energy consumption, which is contrary to original intention of TWT. Therefore, solving the clock drift problem is crucial for the STA participating in TWT.

However, under normal circumstances, the STA wakes up when a scheduled TWT time (which corresponds to one TWT wake period) comes, and is ready to receive the Trigger frame. If the frame is missed due to clock drift, the STA will keep waiting until the next Trigger frame comes, or wait until the next Beacon comes so as to use a timestamp in the Beacon to correct its own clock, and then re-negotiate the next one TWT time with the AP.

Therefore, the above-described solution may have problems below: it may cause failure in Trigger frame reception, thereby missing an opportunity of data interaction with the AP during current TWT wake period; it may lead to longer waiting time and listening time, thereby increasing energy consumption; an incorrect wake time may cause the STA to "incorrectly" wake up simultaneously with other STA and compete for a channel, bringing consumption in unnecessary channel competition, thereby reducing probability of channel access and increasing re-transmission consumption.

Effective solutions have not yet been proposed to address the above-described problems.

SUMMARY

Embodiments of the present disclosure provide a clock correction method and device based on target wake time, to at least solve the technical problems of timing inaccuracy and energy waste caused by clock drift during TWT operation of the STA.

According to an aspect of the embodiments of present disclosure, a clock correction method based on target wake time is provided, the method comprising: determining a first comparison amount and a second comparison amount, where the first comparison amount is determined according to a target clock drift value and a predetermined number, the target clock drift value is a maximum clock drift value between the station STA and the access point AP, the predetermined number is the number of target beacon transmission times TBTTs from a time point at which a Beacon was detected the last time before the STA enters a target wake time TWT sleep period to a time point of a next-time wake time, and the second comparison amount is determined according to an average duration required for a detection interaction process between the station STA and the access point AP and a preset multiple corresponding to the average duration; comparing the first comparison amount with the second comparison amount, and performing clock correction on the STA according to a correction strategy corresponding to a comparison result.

According to an aspect of the embodiments of present disclosure, a clock correction method based on target wake time (TWT) is provided, wherein, each target wake time corresponds to a wake period, and a TWT sleep period of a station STA is before the wake period, and the method comprises: determining a next-time target wake time immediately following a current TWT sleep period, before entering the current TWT sleep period; determining an advance time amount for the next-time target wake time, before entering the current TWT sleep period, based on statistically obtained clock drift values between the STA and an access point AP as well as a number of target beacon transmission times TBTTs corresponding to the current TWT sleep period; and performing clock correction on the STA, according to the advance time amount and an expected time amount required for completing clock correction through a detection interaction process.

According to an aspect of the embodiments of present disclosure, a clock correction method based on target wake time (TWT) is provided, wherein, each target wake time corresponds to a wake period, and a TWT sleep period of a station STA is before the wake period, and the method comprises: determining a next-time target wake time immediately following a current TWT sleep period, before entering the current TWT sleep period; determining an advance time amount for the next-time target wake time, before entering the current TWT sleep period, based on statistically obtained clock drift values between the STA and an access point AP as well as a number of target beacon transmission times TBTTs corresponding to the current TWT sleep period; and causing the STA to wake up at a time point when the next-time target wake time is advanced by the advance time amount, and performing clock correction on the STA according to a predetermined correction strategy.

According to an aspect of the embodiments of present disclosure, a clock correction device based on target wake time (TWT) is provided, wherein, each target wake time corresponds to a wake period, and a TWT sleep period of a station STA is before the wake period, and the device comprises: a determination module, configured to determine a next-time target wake time immediately following the current TWT sleep period, before entering a current TWT sleep period; and determine an advance time amount for the next-time target wake time based on statistically obtained clock drift values between the STA and the access point AP as well as a number of target beacon transmission times TBTTs corresponding to the current TWT sleep period; and a correction module, configured to perform clock correction on the STA, before entering the current TWT sleep period, according to the advance time amount and the expected time amount required for completing clock correction through a detection interaction process.

According to an aspect of the embodiments of present disclosure, a clock correction device based on target wake time (TWT) is provided, wherein, each target wake time corresponds to a wake period, and a TWT sleep period of a station STA is before the wake period, and the device comprises: a determination module, configured to determine a next-time target wake time immediately following the current TWT sleep period, before entering a current TWT sleep period; and determine an advance time amount for the next-time target wake time based on statistically obtained clock drift values between the STA and the access point AP as well as a number of target beacon transmission times TBTTs corresponding to the current TWT sleep period; and a correction module, configured to cause the STA to wake up at a time point when the next-time target wake time is advanced by the advance time amount, and perform clock correction on the STA according to a predetermined correction strategy.

According to an aspect of the embodiments of present disclosure, a communicating device is provided, which comprises: a processor; and a memory, having programs stored thereon, wherein, the programs, when executed, causes the processor to perform the clock correction method based on target wake time as described above.

According to an aspect of the embodiments of present disclosure, a computer readable storage medium is provided, which comprises programs stored thereon, wherein, the programs, when executed, control a device where the computer readable storage medium is located to perform the clock correction method based on target wake time as described.

According to an aspect of the embodiments of present disclosure, a processor is provided, which is configured to execute programs, wherein, the programs, when executed, perform the clock correction method based on target wake time as described above In the embodiments of the present disclosure, by assisting the STA in waking up in advance before the TWT time, to correct its own clock or increase a probability for the STA to be capable of receiving a Trigger frame during the TWT wake period corresponding to the TWT time, technical effects of accurately accessing a channel in the predetermined TWT time, avoiding causing greater overhead, and reducing energy consumption are achieved, which further solves the technical problems of timing inaccuracy and energy waste caused by clock drift during TWT operation of the STA.

BRIEF DESCRIPTION OF THE DRAWINGS

The drawings illustrated here are provided for further understanding the present disclosure and constitute a part of the present disclosure, the exemplary embodiments of the present disclosure and description thereof are used for explaining the present disclosure, rather than improperly limiting the present disclosure. In the drawings.

DETAILED DESCRIPTION

In order to make those skilled in the art to better understand the solution of the present disclosure, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can acquire other embodiment(s), without any inventive labor, which should be within the scope of the present disclosure.

It should be noted that the terms "first", "second", etc. in the specification and the claims of the present disclosure, as well as the above-described accompanying drawings, are used to distinguish similar objects, without necessarily describing a specific order or sequence. It should be understood that the data used in this way may be interchanged in appropriate cases, so that the embodiments of the present disclosure described here may be implemented in an order other than those illustrated or described here. In addition, the terms "including" and "having", as well as any variations thereof, are intended to cover non-exclusive inclusion, for example, processes, methods, systems, products, or devices that include a series of steps or units, need not be limited to those clearly listed steps or units, but may include other steps or units that are not clearly listed or inherent to these processes, methods, products, or devices.

Embodiment 1

According to the embodiment of the present disclosure, there is provided an embodiment of a clock correction method based on target wake time. It should be noted that steps shown in the flow chart of the accompanying drawings may be executed in a computer system such as a group of computer executable instructions. Although a logical order is shown in the flow chart, yet in some cases, the steps shown or described may be executed in a different order.

Figure 1:
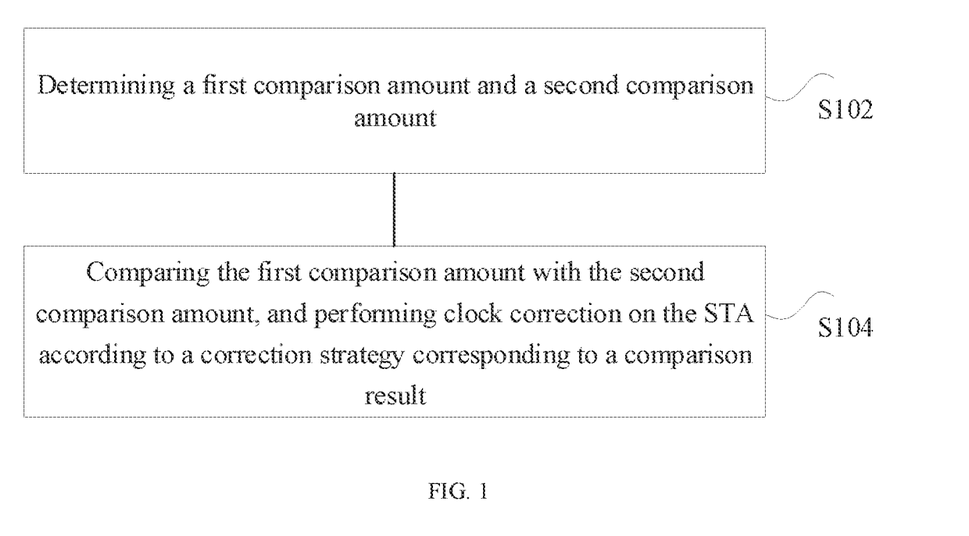
FIG. 1 is a flow chart of a clock correction method based on target wake time according to an embodiment of the present disclosure.

FIG. 1 is a flow chart of the clock correction method based on target wake time according to the embodiment of the present disclosure.

In the present application, for each device (e.g., a station STA), each Target Wake Time (TWT, also referred to as a wake time hereinafter) corresponds to one wake period, and the STA is in a TWT sleep period before the wake period. The STA wakes up at the target wake time and then performs information (e.g., data frame) interaction with an AP connected therewith during the corresponding wake period. After the wake period ends or information interaction is completed, the STA will enter a new TWT sleep period, and repeat in turn.

As shown in FIG. 1, the clock correction method based on target wake time includes the following steps.

In step S102, a first comparison amount and a second comparison amount are determined, where the first comparison amount is determined according to a target clock drift value and a predetermined number. The target clock drift value is a maximum clock drift value between the station STA and the access point AP, and the predetermined number is the number of target beacon transmission times TBTTs from a time point at which a Beacon was detected the last time before the STA enters a target wake time TWT sleep period to a time point of a next-time wake time. The second comparison amount is determined according to an average duration required for a detection interaction process between the station STA and the access point AP and a preset multiple corresponding to the average duration.

In step S104, the first comparison amount is compared with the second comparison amount, and clock correction on the STA is performed according to a correction strategy corresponding to a comparison result.

In addition, every time entering the TWT sleep period, it is necessary to clear historical statistics or calculation information, and repeat the above-described operation again.

Since execution of the TWT mechanism relies on that all devices in the entire network wake/sleep according to a same time schedule, through the above-described steps, the first comparison amount may be compared with the second comparison amount, and clock correction may be performed on the STA according to the correction strategy corresponding to the comparison result, which achieves the purpose of assisting the STA in correcting its own clock before the TWT wake time or increasing a probability for the STA to be capable of receiving the Trigger frame during the TWT wake period, so as to achieve technical effects of accurately accessing a channel at a scheduled TWT time, avoiding causing greater overhead, and reducing energy consumption, to further solve the technical problems of timing inaccuracy and energy waste caused by clock drift during TWT operation of the STA.

It should be noted that the above-described clock correction method based on target wake time includes actively sending a detection request frame/passively waiting for a Beacon or a Trigger frame, as well as counting a clock drift duration of its own, to flexibly process correction of clock drift in combination with different lengths of TWT windows, which is applicable to devices and scenarios with various sleep duration requirements.

Optionally, the determination of the first comparison amount includes: determining the target clock drift value; determining the predetermined number, where when the number of TBTTs is a decimal, it is rounded up to obtain the predetermined number; and multiplying the target clock drift value with the predetermined number to calculate the first comparison amount. The Target Beacon Transmission Time (TBTT) is given as a cycle of an action of sending/receiving a Beacon between the AP and the STA.

In order to accurately calculate the target clock drift value, a plurality of clock drift values when the STA listens Beacons may be collected. The clock drift value is an absolute value of a difference between a timestamp recorded by the STA and a timestamp provided by the AP. Then, a maximum clock drift value is filtered out from the plurality of clock drift values and determined as the target clock drift value. In a specific implementation process, within a period of time, one clock drift value may be recorded every time a Beacon is listened, so as to collect the plurality of clock drift values.

In the specific implementation process, the STA records its own clock drift value during each TBTT interval when listening Beacons at ordinary times. The clock drift value may reflect a difference between the timestamp locally recorded by the STA and the timestamp provided by the AP. It should be noted that the clock drift value may be a positive number or a negative number, and thus is uniformly represented by an absolute value (i.e. a positive number). Since the clock drift value is likely to float, it is necessary to record clock drift values multiple times and filter out a maximum clock drift value from the plurality of clock drift values as the target clock drift value.

In an optional implementation, the number of TBTTs from a time point at which a Beacon was detected the last time before the STA enters a target wake time TWT sleep period to a time point of a next-time target wake time which is immediately following the TWT sleep period, may be taken as the predetermined number.

In a specific implementation process, after the STA participates in TWT, the STA will immediately enter a TWT sleep period, and the STA records a time point when it received the Beacon the last time before entering the TWT sleep period, and then calculates how many TBTTs will be experienced according to a time point at which the STA is scheduled to wake up next time (the next-time target wake time). At this time, the TBTT interval is defaulted to be unchanged. Further, the number of TBTTs may be taken as the predetermined number. If the number of TBTTs is a decimal, it is rounded up to obtain the predetermined number.

In an optional implementation, the STA needs to wake up one time in advance before the next-time wake time comes, and in order to have sufficient time to correct the clock or receive the Trigger frame, the first comparison amount needs to be determined. In the present disclosure, the target clock drift value may be multiplied by the predetermined number to obtain the calculated first comparison amount.

It should be noted that the protocol requires that clock drift value between two devices should not exceed a maximum of 200 ppm, which means that it should not exceed 200 us within 1 second, for example, if TBTT=100 ms (a protocol default value), then the target clock drift value is at most 20 us. The above-described predetermined number depends on a length of the TWT sleep period of the STA, and the longer the sleep period, the greater the clock drift.

Within a period from a time at which the STA wakes up in advance to the next-time wake time, even if the STA is incapable of accessing the channel all the time or does not listen a detection response frame (as described later), the STA will always remain in an active state and will continue to listen the channel. If the STA is capable of receiving the Trigger frame of the AP at this time, information interaction during the TWT wake period may also be started smoothly.

Therefore, waking up in advance may also increase a probability for the STA to receive the Trigger frame.

Optionally, the determination of the second comparison amount includes: acquiring average time length for sending a detection request frame, average time length for receiving a detection response frame, and average time length of a Short Interframe Space (SIFS) of the STA; calculating an average duration, according to the average time length for sending the detection request frame, the average time length for receiving the detection response frame, and the average time length of the Short Interframe Space (SIFS); determining a preset multiple corresponding to the average duration; and multiplying the average duration by the preset multiple corresponding to the average duration, to calculate the second comparison amount.

In an optional implementation, since the STA needs to compete for channel access, a second comparison amount needs to be set accordingly. In order to calculate the second comparison amount more accurately, a sum of the average time length for sending the detection request frame, the average time length for receiving the detection response frame, and the average time length of the Short Interframe Space (SIFS) need to be taken as the average duration, and then, the average duration is multiplied by the preset multiple corresponding to the average duration to obtain the second comparison amount. It should be noted that the above-described preset multiple may be set according to needs of application scenarios, for example, the above-described preset multiple may be 2.

It should be noted that the above-described average duration is determined according to an amount of actual frame body content. For example, the average duration may be calculated according to the average time length for sending the detection request frame, the average time length for receiving the detection response frame, and the average time length of the Short Interframe Space (SIFS), and is usually around 3000 us (3 ms).

Figure 2:
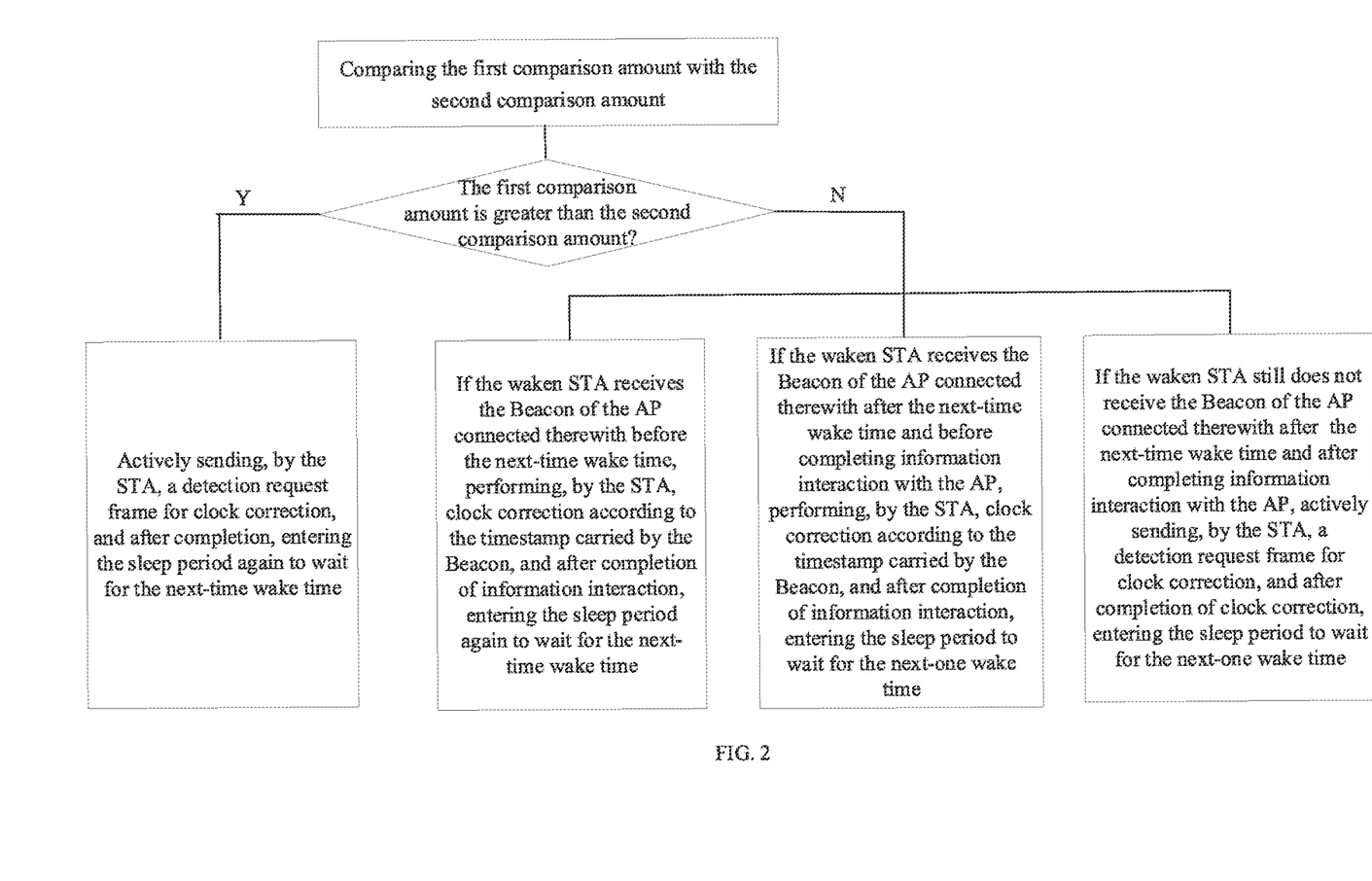
FIG. 2 is a flow chart of clock correction implemented by comparing a first comparison amount with a second comparison amount according to an embodiment of the present disclosure.

As for the process of comparing the first comparison amount with the second comparison amount and performing clock correction on the STA according to the correction strategy corresponding to the comparison result, FIG. 2 is a flow chart of clock correction method implemented by comparing the first comparison amount with the second comparison amount according to the embodiment of the present disclosure; as shown in FIG. 2, the comparison process includes the following steps.

In step S202, the first comparison amount is compared with the second comparison amount.

In step S204, the STA actively sends a detection request frame for clock correction, when the comparison result is that the first comparison amount is greater than the second comparison amount, and after completing clock correction, the STA enters the TWT sleep period again to wait for the next-time wake time. It should be noted that the first comparison amount being greater than the second comparison amount indicates that the STA wakes up one time in advance before the next-time wake time comes and has sufficient time to correct the clock or receive the Trigger frame.

In step S206, three processing modes are involved, when the comparison result is that the first comparison amount is less than or equal to the second comparison amount. The specific processing modes are illustrated as step S2061, step S2062, and step S2063. It should be noted that the first comparison amount being less than or equal to the second comparison amount indicates that the STA may not have time to send the detection request frame or to receive the detection response frame.

In step S2061, if the waken STA successfully receives the Beacon of the AP connected therewith before the next-time wake time, the STA performs clock correction according to the timestamp carried by the Beacon, and after completing clock correction, enters the TWT sleep period again to wait for the next-time wake time.

In step S2062, if the waken STA successfully receives the Beacon of the AP connected therewith after the next-time wake time and before completing information interaction with the AP, the STA performs clock correction according to the timestamp carried by the Beacon, and after completing information interaction, enters a next-one TWT sleep period to wait for a next-one wake time.

In step S2063, if the waken STA still does not receive the Beacon of the AP connected therewith after the next-time wake time and after completing information interaction with the AP, the STA actively sends the detection request frame for clock correction, and after completing clock correction, enters the next-one TWT sleep period to wait for the next-one wake time.

It should be noted that in the context of the present application, the "next-time wake time" (or also expressed as the next-time target wake time) refers to a time point at which STA normally wake ups after the current TWT sleep period ends, and the "next-one wake time (or also expressed as the next-one target wake time)" refers to a time point at which the STA normally wakes up after entering the next-one TWT sleep period.

Since the TWT time window has a flexible size, adopting the above-described implementation of the present disclosure to flexibly handle different drift values caused by different time windows may effectively reduce energy consumption.

Optionally, in the context of the present application, the operation of the STA actively sending the detection request frame for clock correction may include: the STA sending the detection request frame to the AP; the STA receiving the detection response frame returned by the AP, where the detection response frame includes the timestamp of the AP; and the STA performing clock correction at the STA according to the timestamp of the AP.

In an optional implementation, the STA may probably miss the TBTT due to clock drift, resulting in failure to receive the Beacon, and waiting all the time will waste a lot of energy for channel listening, which is not favorable for low-power requirements. However, the present disclosure may utilize the STA to actively send the detection request frame for clock correction. For example, the STA will send the detection request frame to the AP, wait for the detection response frame of the AP, and then perform clock correction according to the timestamp carried in the detection response frame in the AP. Through the implementation, the solution of actively sending the detection request frame for clock correction has higher initiative and flexibility, which may reduce duration and energy consumption of continuously listening and waiting for reception on the channel, and may also reduce the problem of competition for the channel caused by clock errors, and further, may maximize benefits brought by the TWT mechanism per se.

Figure 3A:
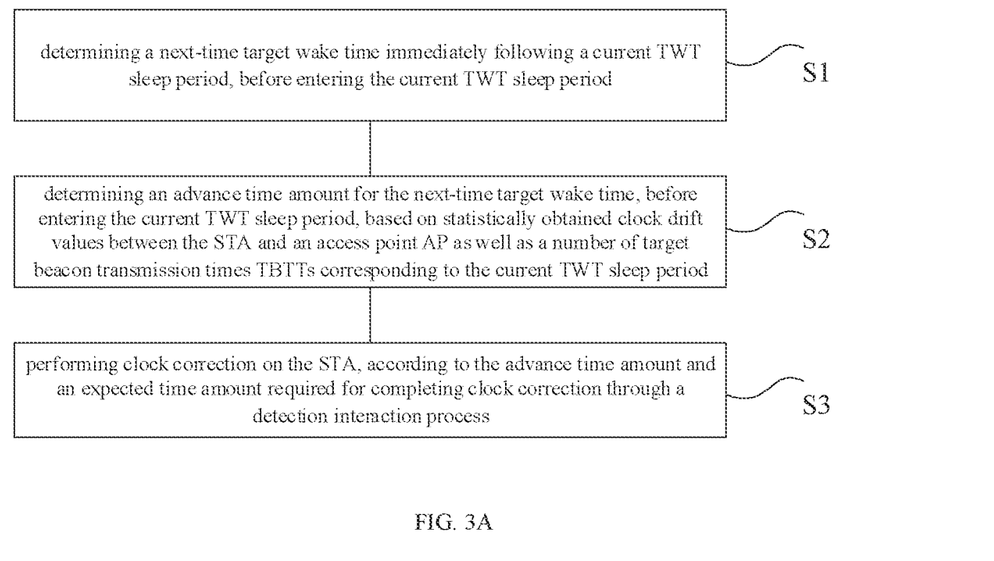
FIG. 3A to FIG. 3B are flow charts of another clock correction method based on target wake time according to an embodiment of the present disclosure.

FIG. 3A is a flow chart of another clock correction method based on target wake time according to an embodiment of the present disclosure.

As shown in FIG. 3A, as a more general implementation, the clock correction method may include the following steps.

In step S1, before entering a current TWT sleep period, a next-time target wake time immediately following the current TWT sleep period is determined.

For example, if the STA wants to establish a TWT connection, the STA will negotiate a TWT time of the first-time TWT with the AP when it wakes, and then the STA will enter the first TWT sleep period. After the STA participates in the first-time TWT, the STA performs information interaction with the AP, the STA is to enter next TWT sleep period, and during a wake period corresponding to the first-time TWT, the STA acquires the second-one TWT time, and repeats in turn.

Optionally, with respect to the approach for acquiring the TWT time, since the STA performs information interaction with the AP during the wake period corresponding to the next-time target wake time immediately following the current TWT sleep period, the STA may acquire the next-one wake time (i.e., the next-one target wake time (t+1) of the next-time target wake time (t)) from the AP based on information interaction with the AP, or may calculate the next-one target wake time based on the next-time target wake time immediately following the current TWT sleep period (e.g., by adding a specific amount of time). Of course, the approach for the STA acquiring each target wake time will not be limited in the present disclosure.

In step S2, before entering the current TWT sleep period, an advance time amount for the next-time target wake time is determined, based on statistically obtained clock drift values between the STA and the access point AP as well as a number of target beacon transmission times TBTTs corresponding to the current TWT sleep period.

Optionally, a target clock drift value may be determined based on the statistically obtained clock drift values between the STA and the access point AP, and then the advance time amount for the next-time target wake time may be determined based on the target clock drift value and the number of target beacon transmission times TBTTs corresponding to the current TWT sleep period.

For example, the target clock drift value may be multiplied by the number of target beacon transmission times TBTTs corresponding to the current TWT sleep period, to calculate the advance time amount. The STA will wake up one time in advance at a time having the advance time amount, so as to have sufficient time to correct the clock or increase the probability of receiving the Trigger frame as described later.

As an example rather than a limitation, the target clock drift value may be determined in a manner below: acquiring a plurality of clock drift values statistically obtained when the STA listens Beacons from the AP, where each clock drift value is an absolute value of a difference between one timestamp recorded by the STA and a corresponding timestamp provided by the AP; taking a value obtained from one of the following as the target clock drift value: a maximum clock drift value filtered out from the plurality of clock drift values; or, a value obtained by multiplying a minimum clock drift value, an average clock drift value, or a median clock drift value obtained from the plurality of clock drift values by a predefined coefficient greater than or equal to 1.

For example, as described above with reference to FIG. 1, one clock drift value may be recorded every time a Beacon is received within a period of time, so as to collect the plurality of clock drift values. Moreover, in a specific implementation process, the STA records its own clock drift value during each TBTT interval when listening the Beacon at ordinary times, where the clock drift value may reflect a difference between the timestamp locally recorded by the STA and the timestamp provided by the AP. It should be noted that the clock drift value may be a positive number or a negative number, and thus is uniformly represented by an absolute value (i.e. a positive number). Since the clock drift value is likely to float, it is necessary to record a plurality of clock drift values and determine the target clock drift value from the plurality of clock drift values.

In addition, the number of TBTTs from a time point at which the Beacon is detected the last time before the STA enters the current TWT sleep period to a time point corresponding to the next-time target wake time immediately following the current TWT sleep period may be taken as the number of target beacon transmission times TBTTs corresponding to the current TWT sleep period.

For example, in a specific implementation process, after the STA completes information interaction during the previous-time TWT wake period, the STA enters the current TWT sleep period, and the STA may record the time point at which the STA receives the Beacon from the AP the last time before entering the current TWT sleep period, and then calculate how many TBTTs will be experienced according to the time point corresponding to the next-time target wake time immediately following the current TWT sleep period. At this time, the TBTT interval is defaulted to be unchanged, for example, a duration between the two time points may be divided by the TBTT interval to obtain the number of TBTTs, and if the number of TBTTs is a decimal, it may be rounded up and then multiplied by the target clock drift value.

Or, other approaches may also be adopted to determine the number of target beacon transmission times TBTTs corresponding to the current TWT sleep period. For example, a duration between time points corresponding to two adjacent TWTs (because the STA may acquire a next TWT through information interaction during the previous one TWT wake period) may also be divided by the TBTT interval to obtain the number of TBTTs.

In step S3, clock correction is performed on the STA, according to the advance time amount and an expected time amount required for completing clock correction through a detection interaction process.

Optionally, when clock correction is performed on the STA according to the advance time amount and the expected time amount, the advance time amount may be taken as the first comparison amount as described above with reference to FIG. 1, and the expected time amount is determined based on the average duration required for the detection interaction process between the station STA and the access point AP, as the second comparison amount. For example, the average duration may be multiplied by a preset multiple, to calculate the expected time amount, as the second comparison amount described above with reference to FIG. 1. The clock correction is performed on the STA based on the comparison result of the first comparison amount and the second comparison amount.

As described above, the average duration required for the detection interaction process may be obtained as follows: acquiring the average time length for sending the detection request frame, the average time length for receiving the detection response frame, and the average time length of the Short Interframe Space (SIFS) of the STA; and calculating the average duration, according to the average time length for sending the detection request frame, the average time length for receiving the detection response frame, and the average time length of the Short Interframe Space (SIFS). For example, a sum of the average time length for sending the detection request frame, the average time length for receiving the detection response frame, and the average time length of the Short Interframe Space (SIFS) may be taken as the average duration.

It should be noted that the above-described preset multiple may be set according to needs of application scenarios. For example, considering that the STA may need to compete with other STAs for accessing the channel connected with the AP, the above-described preset multiple may be set to 2.

More specifically, when performing clock correction on the STA according to the comparison result, the following cases may be included.

Case 1: the comparison result is that the first comparison amount is greater than the second comparison amount (the advance time amount is greater than the expected time amount), at a time point when the next-time target wake time is advanced by the advance time amount, the STA wakes up and sends a detection request frame for clock correction through the detection interaction process, and after completing the clock correction, the STA enters the current TWT sleep period again to wait for the next-time target wake time.

In case 1, the case may correspond to step S204 as described with reference to FIG. 2, indicating that the STA wakes up one time in advance before the next-time target wake time immediately following the current TWT sleep period comes, and has sufficient time to send the detection request frame or receive the detection response frame, that is, to complete the detection interaction process with the AP, so the STA may complete clock correction based on the detection interaction process between the STA and the AP, for example, the STA may update the clock according to the timestamp carried in the detection response frame of the AP.

Case 2: the comparison result is that the first comparison amount is less than or equal to the second comparison amount (when the advance time amount is less than or equal to the expected time amount), at a time point when the next-time target wake time is advanced by the advance time amount, the STA wakes up and starts to listen whether there is a Beacon from the AP, and according to time occasion when the STA successfully receives the Beacon, the STA performs clock correction.

In case 2, the case may correspond to step S2061, step S2062, and step S2063 as described with reference to FIG. 2, indicating that the STA wakes up one time in advance before the next-time target wake time immediately following the current TWT sleep period comes, but may not have sufficient time to send the detection request frame or receive the detection response frame, that is, may not have sufficient time to complete the detection interaction process with the AP, so a different correction strategy may be adopted.

Specifically, in case 2-1, the case may correspond to step S2061 as described with reference to FIG. 2, that is, in a case where the waken STA successfully receives a Beacon from the AP before the next-time target wake time, the STA performs clock correction based on the Beacon (e.g., the timestamp carried thereby), and after completing the clock correction, enters the current TWT sleep period again to wait for the next-time target wake time.

In case 2-2, the case may correspond to step S2062 as described with reference to FIG. 2, that is, when the waken STA successfully receives a Beacon from the AP after the next-time target wake time and before completing information interaction with the AP, the STA performs clock correction based on the Beacon (e.g., the timestamp carried thereby), and after completing information interaction with the AP, the STA enters the next-one TWT sleep period to wait for the next-one target wake time.

In case 2-3, the case may correspond to step S2063 as described with reference to FIG. 2, that is, in a case where the waken STA still does not receive the Beacon from the AP connected therewith after the next-time target wake time and after the STA completes information interaction with the AP, the STA actively sends the detection request frame for clock correction through the detection interaction process, and after completing the clock correction, enters the next-one TWT sleep period to wait for the next-one target wake time.

In addition, in other embodiments, between a time when the next-time target wake time is advanced by the advance time amount and the next-time target wake time, the STA wakes up in advance and remains in a waken state, and when receiving a Trigger frame from the AP, performs information interaction with the AP. That is to say, within a time period from the STA wakes up in advance to the next-time wake time, even if the STA is incapable of accessing the channel or listening the detection response frame all the time, the STA will always remain in an active state and will listen the channel. If the Trigger frame of the AP may be listened at this time, the information interaction during the TWT wake period may also start smoothly, so waking up in advance may also increase a probability for the STA to receive the Trigger frame.

In summary, referring to the clock correction method as described with reference to FIG. 3A, similarly, by setting an advance time amount for each target wake time, a purpose of assisting the STA in correcting its own clock before TWT or increasing a probability for the STA to be capable of receiving the Trigger frame during the TWT operation is achieved, so as to achieve technical effects of accurately accessing a channel in a scheduled TWT time, avoiding causing greater overhead, and reducing energy consumption, to further solve the technical problems of timing inaccuracy and energy waste caused by clock drift during TWT operation of the STA. In addition, the solution that the STA actively sends the detection request frame to perform clock correction through the detection interaction process is also combined, which has higher initiative and flexibility, may reduce duration and energy consumption of continuously listening and waiting for reception on the channel, and may also reduce the problem of competition for the channel caused by clock errors, and further, may maximize benefits brought by the TWT mechanism per se.

In addition, the above-described clock correction methods all achieve the purpose of assisting the STA in waking up at the TWT for correction by setting an advance time amount for each target wake time, so according to another aspect of the present application, there is further provided a clock correction method based on target wake time (TWT).

Figure 3B:
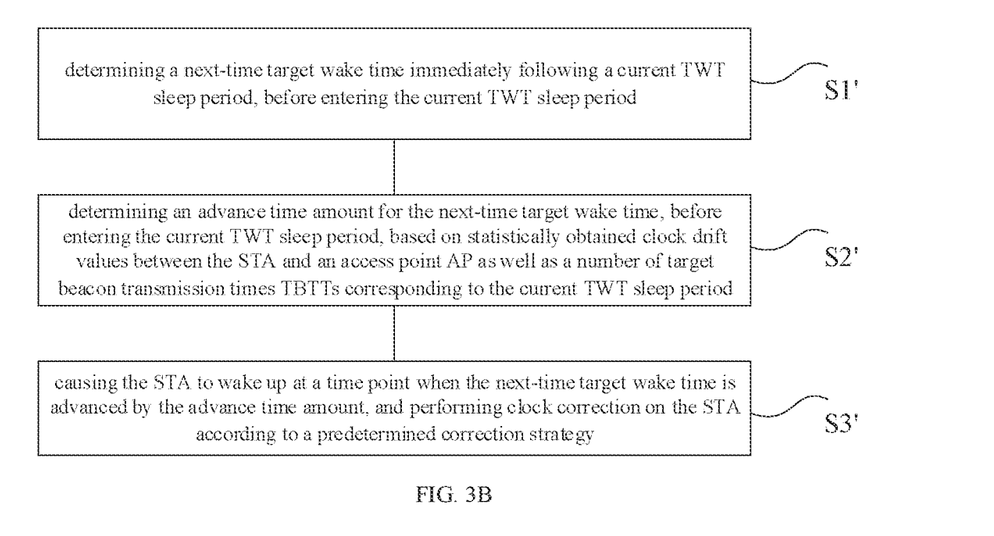

FIG. 3B is a flow chart of another clock correction method based on target wake time according to an embodiment of the present disclosure.

In step S1', before entering a current TWT sleep period, a next-time target wake time immediately following the current TWT sleep period is determined.

In step S2', before entering the current TWT sleep period, an advance time amount for the next-time target wake time is determined, based on statistically obtained clock drift values between the STA and the access point AP as well as a number of target beacon transmission times TBTTs corresponding to the current TWT sleep period.

In step S3', the STA is caused to wake up at a time when the next-time target wake time is advanced by the advance time amount, and clock correction is performed on the STA according to a predetermined correction strategy.

That is to say, in the clock correction method of FIG. 3B, the STA may be caused to wake up in advance, so that a purpose of causing the STA to correct its own clock or increasing the probability for the STA to be capable of listening the trigger frame during the TWT operation may be achieved, so as to achieve the technical effects of accurately accessing the channel in the scheduled TWT time, avoiding greater overhead and reducing energy consumption.

A specific predetermined correction strategy may be determined according to a relationship that the advance time amount and the expected time amount required for completing clock correction through the detection interaction process. This is similar to, for example, the cases shown in FIG. 2 in the previous text.

For example, when the advance time amount is greater than the expected time amount required for completing clock correction through the detection interaction process, the predetermined correction strategy includes that: at a time when the next-time target wake time is advanced by the advance time amount, the STA wakes up and sends the detection request frame for clock correction through the detection interaction process, and after completing the clock correction, enters the current TWT sleep period again to wait for the next-time target wake time.

For example, when the advance time amount is less than or equal to the expected time amount, the predetermined correction strategy includes that: in a case where the waken STA successfully receives the Beacon from the AP before the next-time target wake time, the STA performs clock correction based on the Beacon, and after completing the clock correction, enters the current TWT sleep period again to wait for the next-time target wake time; and/or, in a case where the waken STA receives the Beacon from the AP after the next-time target wake time and before the STA completes information interaction with the AP, the STA performs clock correction based on the Beacon, and after completing information interaction with the AP, enters the next-one TWT sleep period to wait for the next-one target wake time; and/or, in a case where the waken STA still does not successfully receive the Beacon from the AP after the next-time target wake time and after the STA completes information interaction with the AP, the STA sends the detection request frame for clock correction through the detection interaction process, and after completing clock correction, enters the next-one TWT sleep period to wait for the next-one target wake time.

More information on the above-described correction strategy has been described above, and no details will be repeated here.

In this way, whether clock correction may be actively carried out by the STA may be selectively determined, according to whether the advance time amount allows the STA to actively send the detection request frame to perform the clock correction through the detection interaction process, so as to have higher initiative and flexibility, which may reduce duration and energy consumption of continuously listening and waiting for reception on the channel, and may also reduce the problem of competition for the channel caused by clock errors, and further, may maximize benefits brought by the TWT mechanism per se.

Embodiment 2

Figure 4:
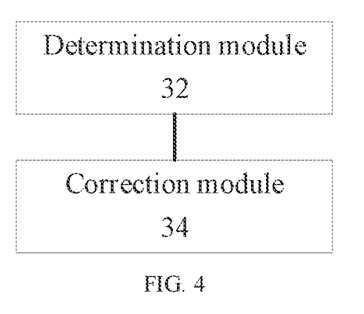
FIG. 4 is a schematic diagram of a clock correction device based on target wake time according to an embodiment of the present disclosure.

According to another aspect of the embodiment of the present disclosure, there is further provided a clock correction device based on target wake time. FIG. 4 is a schematic diagram of a clock correction device based on target wake time according to an embodiment of the present disclosure. As shown in FIG. 4, the clock correction device based on target wake time includes: a determination module 32 and a correction module 34. Below is detailed explanation of the clock correction device based on target wake time.

The determination module 32 is configured to determine a first comparison amount and a second comparison amount, where the first comparison amount is determined according to a target clock drift value and a predetermined number. The target clock drift value is a maximum clock drift value between the station STA and the access point AP, and the predetermined number is the number of target beacon transmission times TBTTs from a time point at which a Beacon is detected the last time before the STA enters a target wake time TWT sleep period to a time point of a next-time wake time. The second comparison amount is determined according to an average duration required for a detection interaction process between the station STA and the access point AP and a preset multiple corresponding to the average duration. The correction module 34, coupled to the above-described determination module 32, is configured to compare the first comparison amount with the second comparison amount, and perform clock correction on the STA according to a correction strategy corresponding to a comparison result.

It should be noted that the above-described respective modules may be implemented through software or hardware. For example, with respect to the latter, the modules may be implemented as: the above-described respective modules may be located in a same processor; and/or, the above-described respective modules are located in different processors in any combination.

In the above-described embodiment, the clock correction device based on target wake time may perform clock correction on the STA by comparing the first comparison amount with the second comparison amount, and according to the correction strategy corresponding to the comparison result, which achieves a purpose of assisting the STA in correcting its own clock before the TWT wake time or increasing a probability for the STA to be capable of listening the Trigger frame during the TWT operation, so as to achieve technical effects of accurately accessing a channel at a target time point, avoiding causing greater overhead, and reducing energy consumption, to further solve the technical problems of timing inaccuracy and energy waste caused by clock drift during TWT operation of the STA.

It should be noted that the determination module 32 and the correction module 34 as described above correspond to step S102 to step S104 according to Embodiment 1. examples and application scenarios implemented by the above-described modules and corresponding steps are the same, but not limited to the content disclosed in the above-described Embodiment 1.

Optionally, the above-described determination module 32 includes: a first determination unit, configured to determine the target clock drift value; and a second determination unit, configured to determine the predetermined number, where when the number of TBTTs is a decimal, it is rounded up to obtain the predetermined number; and a first calculation unit, configured to multiply the target clock drift value with the predetermined number, to calculate the first comparison amount.

Optionally, the first determination unit is configured to include: a collecting sub-unit, configured to collect a plurality of clock drift values when the STA listens Beacons, where the clock drift value is an absolute value of a difference between a timestamp recorded by the STA and a timestamp provided by the AP; and a determination sub-unit, configured to filter out the maximum clock drift value from the plurality of clock drift values and determine the same as the target clock drift value.

Optionally, the above-described determination module 32 includes: an acquisition unit, configured to acquire average time length for sending a detection request frame, average time length for receiving a detection response frame, and average time length of a Short Interframe Space (SIFS) of the STA; a second calculation unit, configured to calculate an average duration, according to the average time length for sending the detection request frame, the average time length for receiving the detection response frame, and the average time length of the Short Interframe Space (SIFS); a third determination unit, configured to determine a preset multiple corresponding to the average duration; and a third calculation unit, configured to multiply the average duration by the preset multiple corresponding to the average duration, to calculate the second comparison amount.

Optionally, the above-described correction module 34 includes: a first correction unit, configured such that the STA actively sends a detection request frame for clock correction, when the comparison result is that the first comparison amount is greater than the second comparison amount, and after completing clock correction, the STA enters the TWT sleep period again to wait for the next-time wake time.

Optionally, the above-described correction module 34 includes: a second correction unit, configured such that in a case where the comparison result is that the first comparison amount is less than or equal to the second comparison amount, if the waken STA successfully receives the Beacon of the AP connected therewith before the next-time wake time, the STA performs clock correction according to the timestamp carried by the Beacon, and after completing clock correction, enters the TWT sleep period again to wait for the next-time wake time; a third correction unit, configured such that in a case where the comparison result is that the first comparison amount is less than or equal to the second comparison amount, if the waken STA successfully receives the Beacon of the AP connected therewith after entering the next-time wake time and before completing information interaction with the AP, the STA performs clock correction according to the timestamp carried by the Beacon, and after completing information interaction, enters the next-one TWT sleep period to wait for the next-one next wake time; a fourth correction unit, configured such that in a case where the comparison result is that the first comparison amount is less than or equal to the second comparison amount, if the waken STA still does not receive the Beacon of the AP connected therewith after the next-time wake time and after completing information interaction with the AP, the STA actively sends the detection request frame for clock correction, and after completing clock correction, enters the next-one TWT sleep period to wait for the next-one next wake time.

Optionally, the above-described first correction unit or the above-described fourth correction unit include: a sending sub-unit, configured to send by the STA the detection request frame to the AP; a receiving sub-unit, configured to receive the detection response frame returned by the AP, where the detection response frame includes the timestamp of the AP; and a correction sub-unit, configured to perform clock correction on the STA according to the timestamp of the AP.

In other implementations, the determination module 32 may alternatively be configured to determine a next-time target wake time immediately following a current TWT sleep period, before entering the current TWT sleep period; and determine an advance time amount for the next-time target wake time based on statistically obtained clock drift values between the STA and the access point AP as well as a number of target beacon transmission times TBTTs corresponding to the current TWT sleep period. The correction module 34 may alternatively be configured to perform clock correction on the STA, according to the advance time amount and the expected time amount required for completing clock correction through the detection interaction process.

Or, the correction module 34 may also alternatively be configured to cause the STA to wake up at a time when the next-time target wake time is advanced by the advance time amount, and perform clock correction on the STA according to a predetermined correction strategy.

The foregoing description of FIG. 1 to FIG. 3B may be referred to for more details of the above-described operations of the determination module 32 and the correction module 34, and no details will be repeated here.

Furthermore, it should be noted that although the above-described respective modules and sub-modules (units or sub-units) are shown in an exemplary manner, it should be understood that functions of respective modules or sub-modules (units or sub-units) may also be recombined according to different functions, or each module may be further divided into more or fewer sub-modules. At least some of the respective modules as mentioned in the present disclosure may be implemented by electronic hardware (e.g., a general-purpose processor, a Digital Signal Processor (DSP), an Application Specific Integrated Circuit (ASIC), a Field Programmable Gate Array (FPGA) or other programmable logic device, a discrete gate or a transistor logic device, and a discrete hardware component, etc.), and computer software (e.g., which may be stored in a Random Access Memory (RAM), a flash memory, a Read Only Memory (ROM), an Erasable Programmable ROM (EPROM), etc.), or a combination of both.

Embodiment 3

According to another aspect of the embodiment of the present disclosure, there is further provided a computer readable storage medium. The computer readable storage medium includes programs stored thereon, wherein, the programs, when executed, control the device where the computer readable storage medium is located to perform any of the above-described clock correction methods based on target wake time.

Optionally, in this embodiment, the above-described computer readable storage medium may be located in any computer terminal in a computer terminal group in a computer network, and/or located in any mobile terminal in a mobile terminal group; and the above-described computer readable storage medium includes programs stored thereon.

Optionally, the programs, when executed, control the device where the computer readable storage medium is located to perform operations below: determining a first comparison amount and a second comparison amount, where the first comparison amount is determined according to a target clock drift value and a predetermined number, the target clock drift value is a maximum clock drift value between the station STA and the access point AP, the predetermined number is the number of target beacon transmission times TBTTs from a time point at which a Beacon was detected the last time before the STA enters a target wake time TWT sleep period to a time point of a next-time wake time, and the second comparison amount is determined according to an average duration required for a detection interaction process between the station STA and the access point AP and a preset multiple corresponding to the average duration; and comparing the first comparison amount with the second comparison amount, and performing clock correction on the STA according to a correction strategy corresponding to a comparison result.

Optionally, the determination of the first comparison amount includes: determining the target clock drift value; determining the predetermined number, where when the number of TBTTs is a decimal, it is rounded up to obtain the predetermined number; and multiplying the target clock drift value with the predetermined number to calculate the first comparison amount.

Optionally, the determination of the target clock drift value includes: collecting a plurality of clock drift values when the STA listens Beacons, where the clock drift value is an absolute value of a difference between a timestamp recorded by the STA and a timestamp provided by the AP; and filtering out a maximum clock drift value from the plurality of clock drift values and determining the same as the target clock drift value.

Optionally, the determination of the second comparison amount, includes: acquiring average time length for sending a detection request frame, average time length for receiving a detection response frame, and average time length of a Short Interframe Space (SIFS) of the STA; calculating an average duration, according to the average time length for sending the detection request frame, the average time length for receiving the detection response frame, and the average time length of the Short Interframe Space (SIFS); and determining a preset multiple corresponding to the average duration; and multiplying the average duration by the preset multiple corresponding to the average duration, to calculate the second comparison amount.

Optionally, comparing the first comparison amount with the second comparison amount, and performing clock correction on the STA according to a correction strategy corresponding to a comparison result, includes: actively sending, by the STA, a detection request frame for clock correction, when the comparison result is that the first comparison amount is greater than the second comparison amount, and after completing clock correction, the STA entering the TWT sleep period again to wait for the next-time wake time.

Optionally, comparing the first comparison amount with the second comparison amount, and performing clock correction on the STA according to a correction strategy corresponding to a comparison result, includes: in a case where the comparison result is that the first comparison amount is less than or equal to the second comparison amount, if the waken STA successfully receives a Beacon of the AP connected therewith before the next-time wake time, performing, by the STA, clock correction according to the timestamp carried by the Beacon, and after completing clock correction, entering the TWT sleep period again to wait for the next-time wake time; in a case where the comparison result is that the first comparison amount is less than or equal to the second comparison amount, if the waken STA successfully receives a Beacon of the AP connected therewith after the next-time wake time and before completing information interaction with the AP, performing, by the STA, clock correction according to the timestamp carried by the Beacon, and after completing information interaction, entering the next-one TWT sleep period to wait for the next-one next wake time; in a case where the comparison result is that the first comparison amount is less than or equal to the second comparison amount, if the waken STA still does not receive the Beacon of the AP connected therewith after the next-time wake time and after completing information interaction with the AP, actively sending, by the STA, the detection request frame for clock correction, and after completing clock correction, entering the next-one TWT sleep period to wait for the next-one next wake time.

Optionally, the STA actively sending the detection request frame for clock correction, includes: the STA sending the detection request frame to the AP; receiving the detection response frame returned by the AP, where the detection response frame includes the timestamp of the AP; and performing clock correction on the STA according to the timestamp of the AP.

In some other implementations, the programs, when executed, control the device where the computer readable storage medium is located to perform operations below: determining a next-time target wake time immediately following a current TWT sleep period, before entering the current TWT sleep period; determining an advance time amount for the next-time target wake time, before entering the current TWT sleep period, based on statistically obtained clock drift values between the STA and the access point AP as well as a number of target beacon transmission times TBTTs corresponding to the current TWT sleep period; and performing clock correction on the STA, according to the advance time amount and an expected time amount required for completing clock correction through the detection interaction process.

Or, after determining the advance time amount, the programs, when executed, further control the device where the computer readable storage medium is located to execute operation below: causing the STA to wake up at a time when the next-time target wake time is advanced by the advance time amount, and performing clock correction on the STA according to a predetermined correction strategy.

The foregoing description of FIG. 1 to FIG. 3B may be referred to for more details of these operations, and no details will be repeated here.

Embodiment 4

According to another aspect of the embodiment of the present disclosure, there is further provided a processor. The processor is configured to execute programs, and the programs, when executed, perform the clock correction methods based on target wake time as described above with reference to FIG. 1 to FIG. 3B.

The embodiment of the present disclosure provides a device, for example, a communicating device (e.g., a station STA). The device may include a processor, a memory, and programs stored in the memory that may be executed on the processor. When executing the programs, the processor implements steps of: determining a first comparison amount and a second comparison amount, where the first comparison amount is determined according to a target clock drift value and a predetermined number, the target clock drift value is a maximum clock drift value between the station STA and the access point AP, the predetermined number is the number of target beacon transmission times TBTTs from a time point at which a Beacon was detected the last time before the STA enters a target wake time TWT sleep period to a time point of next-time wake, and the second comparison amount is determined according to an average duration required for a detection interaction process between the station STA and the access point AP and a preset multiple corresponding to the average duration; and comparing the first comparison amount with the second comparison amount, and performing clock correction on the STA according to a correction strategy corresponding to a comparison result.

Optionally, the determination of the first comparison amount includes: determining the target clock drift value; determining the predetermined number, where when the number of TBTTs is a decimal, it is rounded up to obtain the predetermined number; and multiplying the target clock drift value with the predetermined number to calculate the first comparison amount.

Optionally, the determination of the target clock drift value includes: collecting a plurality of clock drift values when the STA listens Beacons, where the clock drift value is an absolute value of a difference between a timestamp recorded by the STA and a timestamp provided by the AP; and filtering out a maximum clock drift value from the plurality of clock drift values and determining the same as the target clock drift value.

Optionally, the determination of the second comparison amount includes: acquiring average time length for sending a detection request frame, average time length for receiving a detection response frame, and average time length of a Short Interframe Space (SIFS) of the STA; calculating an average duration, according to the average time length for sending the detection request frame, the average time length for receiving the detection response frame, and the average time length of the Short Interframe Space (SIFS); determining a preset multiple corresponding to the average duration; and multiplying the average duration by the preset multiple corresponding to the average duration, to calculate the second comparison amount.

Optionally, comparing the first comparison amount with the second comparison amount, and performing clock correction on the STA according to a correction strategy corresponding to a comparison result, includes: actively sending, by the STA, a detection request frame for clock correction, when the comparison result is that the first comparison amount is greater than the second comparison amount, and after completing clock correction, entering the TWT sleep period to wait for the next-time wake time.

Optionally, comparing the first comparison amount with the second comparison amount, and performing clock correction on the STA according to a correction strategy corresponding to a comparison result, includes: in a case where the comparison result is that the first comparison amount is less than or equal to the second comparison amount, if the waken STA successfully receives a Beacon of the AP connected therewith before the next-time wake time, performing, by the STA, clock correction according to the timestamp carried by the Beacon, and after completing clock correction, entering the TWT sleep period again to wait for the next-time wake time; in a case where the comparison result is that the first comparison amount is less than or equal to the second comparison amount, if the waken STA successfully receives a Beacon of the AP connected therewith after the next-time wake time and before completing information interaction with the AP, performing, by the STA, clock correction according to the timestamp carried by the Beacon, and after completing information interaction, entering the next-one TWT sleep period to wait for the next-one next wake time; in a case where the comparison result is that the first comparison amount is less than or equal to the second comparison amount, if the waken STA still does not receive the Beacon of the AP connected therewith after the next-time wake time and after completing information interaction with the AP, actively sending, by the STA, the detection request frame for clock correction, and after completing clock correction, entering the next-one TWT sleep period to wait for the next-one next wake time.

Optionally, the STA actively sending the detection request frame for clock correction, includes: the STA sending the detection request frame to the AP; receiving the detection response frame returned by the AP, where the detection response frame includes the timestamp of the AP; and performing clock correction on the STA according to the timestamp of the AP.

In some other implementations, the processor, when executing the programs, may alternatively implement steps of: determining a next-time target wake time immediately following a current TWT sleep period, before entering the current TWT sleep period; determining an advance time amount for the next-time target wake time, before entering the current TWT sleep period, based on statistically obtained clock drift values between the STA and the access point AP as well as a number of target beacon transmission times TBTTs corresponding to the current TWT sleep period; and performing clock correction on the STA, according to the advance time amount and an expected time amount required for completing clock correction through the detection interaction process.

Or, after determining the advance time amount, the processor, when executing the programs, may further alternatively implement steps of: causing the STA to wake up at a time when the next-time target wake time is advanced by the advance time amount, and performing clock correction on the STA according to a predetermined correction strategy.

The foregoing description of FIG. 1 to FIG. 3B may be referred to for more details of these operations, and no details will be repeated here. The serial numbers of the above-described embodiments of the present disclosure are only for description and do not represent advantages or disadvantages of the embodiments.

In the above-described embodiments of the present disclosure, description of the respective embodiments has its own emphasis; and for parts that are not detailed in a certain embodiment, relevant descriptions of other embodiments may be referred to.

In the several embodiments provided in the present application, it should be understood that the disclosed technical content may be implemented in other ways. The device embodiment as described above is only schematic, for example, the division of the units may be logical functional division, and in actual implementation, there may be other division manners, for example, a plurality of units or components may be combined or integrated into another system, or some features may be ignored or not executed. On the other hand, coupling or communication connection shown or discussed between each other may be direct coupling or indirect coupling or communication connection through some interfaces, units, or modules, which may be in a form of electricity or other forms.

The above-described units illustrated as separate parts may be, or may not be physically separated, and the parts shown as units may be, or may not be, physical units, that is, they may be located in one place, or may also be distributed to a plurality of units; and some or all of the units may be selected according to actual needs to achieve the purpose of the solutions of this embodiment.

In addition, the respective functional units or modules according to the respective embodiments of the present disclosure may be integrated in a processing unit or module, or each unit or module may physically exist separately, or two or more units or modules may be integrated in a processing unit or module. The above-described integrated units or modules may be implemented in a form of hardware (e.g., a general-purpose processor, a Digital Signal Processor (DSP), an Application Specific Integrated Circuit (ASIC), a Field Programmable Gate Array (FPGA) or other programmable logic device, a discrete gate or a transistor logic device, and a discrete hardware component, etc.), or may also be implemented in a form of software (e.g., which may be stored in a Random Access Memory (RAM), a flash memory, a Read Only Memory (ROM), an Erasable Programmable ROM (EPROM), etc.), or a combination of both.

If the above-described integrated unit is implemented in a form of software functional unit and sold or used as an independent product, it may also be stored in a computer readable storage medium. Based on such understanding, the technical solution of the present disclosure, in essence, or the part that contributes to the prior art, or all or part of the technical solution, may be embodied in a form of a software product. The computer software product is stored in a storage medium and includes several instructions so that a computer device (which may be a personal computer, a server, or a network device, etc.) to execute all or part of steps of the methods according to the respective embodiments of the present disclosure. The foregoing storage medium includes: a USB flash drive, a Read Only Memory (ROM), a Random Access Memory (RAM), a removable hard drive, a magnetic disk or an optical disk, and various media that may store program codes.

The above is only preferred implementations of the present disclosure. It should be pointed out that for those ordinarily skilled in the art, several improvements and embellishments may be made without departing from the principles of the present disclosure. These improvements and embellishments should also be considered as the scope of protection of the present disclosure.

The invention claimed is:

1. A clock correction method based on target wake time (TWT), wherein, each target wake time corresponds to a wake period, and a TWT sleep period of a station STA is before the wake period, the method comprising:
   determining a next-time target wake time immediately following a current TWT sleep period, before entering the current TWT sleep period;
   determining an advance time amount for the next-time target wake time, before entering the current TWT sleep period, based on statistically obtained clock drift values between the STA and an access point AP as well as a number of target beacon transmission times TBTTs corresponding to the current TWT sleep period; and
   performing clock correction on the STA, according to the advance time amount and an expected time amount required for completing clock correction through a detection interaction process.

2. The method according to claim 1, wherein, determining an advance time amount for the next-time target wake time, based on statistically obtained clock drift values between the STA and an access point AP as well as a number of target beacon transmission times TBTTs corresponding to the current TWT sleep period, comprises:
   determining a target clock drift value based on the statistically obtained clock drift values between the STA and the access point AP; and
   multiplying the target clock drift value by the number of target beacon transmission times TBTTs corresponding to the current TWT sleep period, to determine the advance time amount for the next-time target wake time.

3. The method according to claim 2, wherein, determining a target clock drift value based on the statistically obtained clock drift values between the STA and the access point AP, comprises:
   acquiring a plurality of clock drift values statistically obtained when the STA listens Beacons from the AP, each clock drift value being an absolute value of a difference between one timestamp recorded by the STA and a corresponding timestamp provided by the AP; and
   taking a value obtained from one of the following as the target clock drift value:
   a maximum clock drift value filtered out from the plurality of clock drift values; or,
   a value obtained by multiplying a minimum clock drift value, an average clock drift value, or a median clock drift value obtained from the plurality of clock drift values by a target coefficient greater than or equal to 1.

4. The method according to claim 1, wherein, the expected time amount is determined based on an average duration required for the detection interaction process between the station STA and the access point AP, and the average duration is determined as below:
   acquiring average time length for sending a detection request frame, average time length for receiving a detection response frame, and average time length of a Short Interframe Space (SIFS) of the STA; and
   calculating the average duration, according to the average time length for sending the detection request frame, the average time length for receiving the detection response frame, and the average time length of the Short Interframe Space (SIFS).

5. The method according to claim 1, wherein, performing clock correction on the STA, according to the advance time amount and the expected time amount required for completing clock correction through the detection interaction process, comprises:
   in a case where the advance time amount is greater than the expected time amount, at a time point when the next-time target wake time is advanced by the advance time amount, the STA waking up and sending a detection request frame for clock correction through the detection interaction process, and after completing the clock correction, entering the current TWT sleep period again to wait for the next-time target wake time.

6. The method according to claim 1, wherein, performing clock correction on the STA, according to the advance time amount and the expected time amount required for completing clock correction through the detection interaction process, comprises:
   in a case where the advance time amount is less than or equal to the expected time amount, at a time point when the next-time target wake time is advanced by the advance time amount, the STA waking up and starting to listen a Beacon from the AP; and
   performing clock correction on the STA according to time occasion of receiving the Beacon from the AP.

7. The method according to claim 6, wherein, performing clock correction on the STA, according to time occasion of receiving the Beacon from the AP, comprises:
   in a case where the waken STA successfully receives the Beacon from the AP before the next-time target wake time, performing, by the STA, clock correction based on the Beacon, and after completing the clock correction, entering the current TWT sleep period again to wait for the next-time target wake time.

8. The method according to claim 6, wherein, performing clock correction on the STA, according to time occasion of receiving the Beacon from the AP, comprises:
in a case where the waken STA successfully receives the Beacon from the AP after the next-time target wake time and before the STA completes information interaction with the AP, performing, by the STA, clock correction based on the Beacon, and after completing information interaction with the AP, entering the next-one TWT sleep period to wait for the next-one target wake time.

9. The method according to claim 6, wherein, performing clock correction on the STA according to successfully receives the Beacon from the AP, comprises:
in a case where the waken STA still does not receive the Beacon from the AP after the next-time target wake time and after the STA completes information interaction with the AP, sending, by the STA, a detection request frame for clock correction through the detection interaction process, and after completing clock correction, entering the next-one TWT sleep period to wait for the next-one target wake time.

10. The method according to claim 9, wherein, sending, by the STA, a detection request frame for clock correction through the detection interaction process, comprises:
send, by the STA, the detection request frame to the AP;
receiving, by the STA, a detection response frame returned by the AP, the detection response frame comprising a timestamp of the AP; and
performing, by the STA, clock correction on the STA according to the timestamp of the AP.

11. A clock correction method based on target wake time (TWT), wherein, each target wake time corresponds to a wake period, and a TWT sleep period of a station STA is before the wake period, the method comprising:
determining a next-time target wake time immediately following a current TWT sleep period, before entering the current TWT sleep period;
determining an advance time amount for the next-time target wake time, before entering the current TWT sleep period, based on statistically obtained clock drift values between the STA and an access point AP as well as a number of target beacon transmission times TBTTs corresponding to the current TWT sleep period; and
causing the STA to wake up at a time point when the next-time target wake time is advanced by the advance time amount, and performing clock correction on the STA according to a predetermined correction strategy.

12. The method according to claim 11, wherein, in a case where the advance time amount is greater than the expected time amount required for completing clock correction through the detection interaction process, the predetermined correction strategy comprises that: at a time point when the next-time target wake time is advanced by the advance time amount, the STA wakes up and sends a detection request frame for clock correction through the detection interaction process, and after completing the clock correction, enters the current TWT sleep period again to wait for the next-time target wake time.

13. The method according to claim 11, wherein, in a case where the advance time amount is less than or equal to the expected time amount required for completing clock correction through the detection interaction process, the predetermined correction strategy comprises that:

in a case where the waken STA receives a Beacon from the AP before the next-time target wake time, the STA performs clock correction based on the Beacon, and after completing the clock correction, enters the current TWT sleep period again to wait for the next-time target wake time.

14. The method according to claim 11, wherein, in a case where the advance time amount is less than or equal to the expected time amount required for completing clock correction through the detection interaction process, the predetermined correction strategy comprises that:
in a case where the waken STA receives a Beacon from the AP after the next-time target wake time and before the STA completes information interaction with the AP, the STA performs clock correction based on the Beacon, and after completing information interaction with the AP, enters the next-one TWT sleep period to wait for the next-one target wake time.

15. The method according to claim 11, wherein, in a case where the advance time amount is less than or equal to the expected time amount required for completing clock correction through the detection interaction process, the predetermined correction strategy comprises that:
in a case where the waken STA still does not receive a Beacon from the AP after the next-time target wake time and after the STA completes information interaction with the AP, the STA sends a detection request frame for clock correction through the detection interaction process, and after completing clock correction, enters the next-one TWT sleep period to wait for the next-one target wake time.

16. A clock correction device based on target wake time, wherein, each target wake time corresponds to a wake period, and a TWT sleep period of a station STA is before the wake period, the apparatus comprising:
a determination module, configured to determine a next-time target wake time immediately following the current TWT sleep period, before entering a current TWT sleep period; and determine an advance time amount for the next-time target wake time based on statistically obtained clock drift values between the STA and the access point AP as well as a number of target beacon transmission times TBTTs corresponding to the current TWT sleep period; and
a correction module, configured to perform clock correction on the STA, before entering the current TWT sleep period, according to the advance time amount and the expected time amount required for completing clock correction through a detection interaction process.

17. A communicating device, comprising:
a processor; and
a memory, having programs stored thereon, wherein, the programs, when executed, causes the processor to perform the clock correction method based on target wake time according to claim 1.

18. A computer readable storage medium, comprising programs stored thereon, wherein, the programs, when executed, control a device where the computer readable storage medium is located to perform the clock correction method based on target wake time according to claim 1.

19. A communicating device, comprising:
a processor; and
a memory, having programs stored thereon, wherein, the programs, when executed, causes the processor to perform the clock correction method based on target wake time according to claim 11.

20. A computer readable storage medium, comprising programs stored thereon, wherein, the programs, when executed, control a device where the computer readable storage medium is located to perform the clock correction method based on target wake time according to claim 11.

\* \* \* \* \*